United States Patent [19]

Crespo

[11] 4,119,740
[45] Oct. 10, 1978

[54] COCOA EXTENDER

[75] Inventor: Silvio Crespo, Lititz, Pa.

[73] Assignee: Wilbur Chocolate Company, Inc., Lititz, Pa.

[21] Appl. No.: 806,547

[22] Filed: Jun. 14, 1977

[51] Int. Cl.$^2$ ............................................. A23G 1/00
[52] U.S. Cl. .................................. 426/631; 426/584; 426/593; 426/634; 426/466
[58] Field of Search ............... 426/629, 631, 632, 634, 426/593, 584, 459, 466

[56] References Cited

FOREIGN PATENT DOCUMENTS

| | | |
|---|---|---|
| 703,403 | 2/1965 | Canada. |
| 2,049,642 | 3/1971 | France. |
| 6,373 of | 1905 | United Kingdom. |

OTHER PUBLICATIONS

Cook; L. R., Chocolate Production and Use, Magazines for Industry Inc., N.Y. 1963, (pp. 194–197, 204, 205 & 212–215).

Harris, et al., Development and Use of Defatted Peanut Flours, Meals, and Grits, Agricultural Experiment Station, Auburn University Alabama, Bulletin 431, 1972 (pp. 14–17, 30, 31 & 34–37).

*Primary Examiner*—David M. Naff
*Attorney, Agent, or Firm*—Howson and Howson

[57] ABSTRACT

Cocoa is extended by adding thereto a cocoa extender prepared by roasting peanut grit, almond shells or soybean flakes at a temperature of from about 275° F to about 475° F for from about 20 to about 90 minutes, and after roasting pulverizing the peanut grit, almond shells or soybean flakes to about 200 mesh.

30 Claims, No Drawings

COCOA EXTENDER

BACKGROUND OF THE INVENTION

Cocoa and compound chocolate (confectioner's chocolate) are prepared customarily with material derived from roasted cocoa bean nibs. In recent times the scarcity of cocoa beans, brought about by adverse weather conditions and other factors, has caused the price of all products obtained from cocoa beans to rise dramatically. Cocoa bean processors, and manufacturers of all products consisting of or containing chocolate or any material derived from the cocoa bean, e.g. cocoa, cocoa butter, etc., have been forced to seek some means of reducing the cost of many products usually prepared with or from cocoa bean materials. The present invention is concerned with the development of materials which may be used to reduce or perhaps replace, the amount of cocoa bean derived material in cocoa or compound chocolate.

An ideal substitute for cocoa bean derived material in cocoa or compound chocolate must have physical properties and attributes most nearly approximating bean derived materials including color, consistency, mouth and taste. That is, it is not enough to merely provide chocolate flavor (there are many such imitation flavors available), nor is it enough to provide chocolate-like color. Cocoa, for example, is used in many recipes where it provides flavor, color, bulk, mouth feel, appearance, etc. to a food product. One cannot merely substitute a small amount of imitation chocolate flavor to cocoa in such recipes because the bulk producing property and other characteristics of cocoa will be lacking.

In the present application, "cocoa" or "cocoa powder" refers to the material produced by pulverizing or grinding the cake or cocoa matter obtained by subjecting chocolate liquor to strong hydraulic pressure to remove some of the fat or "cocoa butter." Cocoa or cocoa powder is recognized in the United States as a "breakfast cocoa" containing not less than 22% cocoa fat, "medium fat cocoa" containing between 14 and 18% cocoa fat, and "low fat cocoa" containing less than 10% to 12% cocoa fat. Compound chocolate or "confectionary coating" refers to that combination of cocoa, vegetable fat, sugar, milk solids and flavor typically used by candy manufacturers to coat centers or candy bars.

DETAILED DESCRIPTION OF THE INVENTION

One facet of the invention includes a compound chocolate containing roasted, pulverized peanut grit, almond shells or soybean flakes as a substitute for a portion of the cocoa which would normally be included in the compound chocolate. It will be readily apparent that the invention contemplates use of either roasted, pulverized peanut grit, almond shells or soybean flakes alone or mixtures of two or more of these three materials in any proportion. Therefore, for convenience the term cocoa extender will be used in the specification and claims to identify either roasted, pulverized peanut grit, almond shells or soy bean flakes or mixtures thereof in any proportion. Other facets of the invention include cocoa powder containing the cocoa extender and a process for preparing cocoa and compound chocolate containing the cocoa extender.

The cocoa extender of this invention is derived from peanut grit, almond shells and soybean flakes. Each of these materials are available commercially, peanut grit consisting of the material obtained when peanuts are finely ground, partially defatted and dried. Almond shells are the thin outermost cover or shell on raw almond nutmeat, and not the outer, hard shell of the almond. Soybean flakes are obtained in conventional manners by flaking soybeans which have been cracked, dehulled, partially defatted and dried to a moisture content of about 3%.

To prepare the cocoa extender of this invention, peanut grit, almond shells or soybean flakes are initially roasted in conventional roasting apparatus such as a rotating steel drum. A number of variables enter into the roasting process including the size of the material roasted, roasting temperature and time. Generally speaking, the material roasted will be relatively coarse, as roasting of extremely fine materials requires great caution and constant attention due to tendency to burn, and danger of combustion or explosion. Roasting can be accomplished at temperatures of from about 275° F. to about 475° F. for from about 20 minutes to about 90 minutes, the time required for roasting decreasing with higher temperatures in this range. In any event, peanut grit, almond shells and soybean flakes are roasted under conditions of temperature and time sufficient to develop a rich chocolate brown or cocoa imparting color in the cocoa extender.

The roasting process does more than impart the required color to peanut grit, almond shells and soybean flake. For example, roasting affects the development of taste or flavor characteristics of these materials. Those in the art would not expect, and it is not necessary, that the roasting process impart chocolate or chocolate-like flavor to the roasted materials. However, it is imperative that the roasting process not develop taste or flavor characteristics in the roasted materials which are inimical to chocolate flavor or which are otherwise so pronounced as to impart distinctly non-chocolate flavor or other undesired flavor in any products with which the roasted material may be used. Also, it is imperative that the roasting process should not destroy or impart physical properties to the roasted material, i.e. friability, which would be incompatible with products prepared with conventional cocoa bean derivatives.

Surprisingly, it has been found that peanut grit, almond shells and soybean flakes may be roasted in the manner described herein and develop rich chocolate brown color without developing any taste or flavor characteristics inimical with chocolate flavor or any other undesired flavor or physical property.

It is also possible to roast peanut grit, almond shells and soybean flakes at temperatures below those set forth above with the aid of vacuum; for example, roasting temperatures can be reduced on the order of 50° F. in the presence of vacuum of about 15 psi. The lower the roasting temperature, the less likelihood there is of developing strong flavor characteristics in the roasted material.

Once roasted to the desired chocolate brown color, the peanut grit, almond shells or soybean flakes are pulverized to a particle size most nearly approximating well-known cocoa or 200 ± 10% mesh. Conventional apparatus is used to accomplish necessary pulverizing or grinding. It has been found that roasted peanut grit, almond shells and soybean flakes when ground to 200 ± 10% mesh have physical properties and characteristics such that they may be used as a substitute for cocoa in cocoa powder or compound chocolate.

Compound chocolate or confectioners chocolate of the milk chocolate type prepared in accordance with this invention comprises from about 5 to about 15%, preferably about 10% cocoa, from about 5 to about 15%, preferably about 10%, of a cocoa extender selected from the group consisting of roasted, pulverized peanut grit, almond shells and soybean flakes; from about 30 to about 40%, preferably about 35% sugar; from about 10 to about 15%, preferably about 15% milk solids; and from about 25 to about 35% preferably about 30%, vegetable fat, said compound chocolate having the color, bulk producing properties, mouth feel and flavor of composed chocolate produced with cocoa bean derived material alone.

The presence of milk solids indicates that the foregoing compound chocolate is of the milk chocolate type. "Dark" compound chocolate may also be prepared in accord with the invention with omission of milk solids, a "dark" compound chocolate comprising from about 5 to about 15%, preferably about 12.5%, cocoa; from about 5 to about 15%, preferably about 12.5%, cocoa extender selected from the group consisting of roasted, pulverized peanut grit, almond shells and soybean flakes; from about 40 to about 50%, preferably about 45% sugar; and from about 25 to about 35%, preferably about 30% vegetable fat, said compound chocolate having the color, bulk producing properties, mouth feel and flavor of "dark" compound chocolate produced with cocoa bean derived material alone.

Cocoa powder and cocoa extender may be combined in any proportion in the range of 1:99 to 99:1 for use in preparing the compound chocolate of this invention or for providing cocoa powder having the color, bulk, mouth feel and flavor of cocoa prepared solely with cocoa bean derived material. Typically, mixtures containing equal amounts of cocoa and cocoa extender are useful in preparing extended cocoa and compound chocolate. The cocoa extender of this invention has been found so useful as a substitute for cocoa bean derived material in cocoa and compound chocolate that it is thought that the amount of cocoa extender used in preparing such products will increase or decrease in direct relationship with the price of cocoa bean derived material. It will be understood by those in the art that chocolate flavor of cocoa or compound chocolate containing the cocoa extender of this invention could be enhanced by addition of well-known imitation chocolate flavors, although said additions are not thought necessary. Also, vanillin or other flavoring agents typically used in compound chocolate may be included in compound chocolate containing the cocoa extender of this invention.

Other components of compound chocolate containing the cocoa extender of this invention are those conventionally used in preparing this product, i.e. sugar, milk solids (usually non-fat dry milk solids) and vegatable fats. Both lauric and non-lauric vegetable fats are used in preparing compound chocolate, typical lauric vegetable fats including palm kernel oil and cocoanut oil and non-lauric vegetable fats including soya oil, cottonseed oil and palm oil The cocoa extender of this invention may be acid neutralized or "dutched," and used as an extender for cocoa and compound chocolate. Acid neutralization is accomplished with the addition of suitable amounts of food grade alkali such as alkali metal, alkaline earth metal, neutral bicarbonates and carbonates, including sodium bicarbonate, potassium bicarbonate, magnesium carbonate and ammonium carbonate, either before or during roasting of the cocoa extender to obtain a cocoa extender having a pH between 5.2 and 8.

The invention also contemplates a process for preparing compound chocolate containing reduced quantities of cocoa yet having the color, bulk, mouth feel and flavor of compound chocolate containing usual levels of cocoa comprising roasting a cocoa extender selected from the group consisting of peanut grit, almond shells and soybean flakes at a temperature and for a time sufficient to develop a rich brown cocoa imparting color in said cocoa extender, pulverizing said roasted cocoa extender to a cocoa-like consistency, combining said pulverized, roasted cocoa extender with cocoa, sugar, milk solids and vegetable fats to provide compound chocolate comprising from about 5 to about 15%, preferably about 10%, cocoa; from about 5 to about 15%, preferably about 10%, cocoa extender; from about 30 to about 40%, preferably about 35%, sugar, from about 10% to about 15%, preferably about 15%, milk solids; and from about 25 to about 35%, preferably about 30% vegetable fat, said chocolate compound having the color, bulk, mouth feel and flavor of conventional compound chocolate.

Compound chocolate of the "dark" chocolate type may be prepared in a similar manner by omitting milk solids and combining the cocoa extender with cocoa, sugar and vegetable fat to provide compound chocolate comprising from about 5 to about 15%, preferably about 12.5%, cocoa; from about 5 to about 15%, preferably about 12.5% cocoa extender; from about 40 to about 50%, preferably about 45%, sugar; and from about 25 to about 35%, preferably about 30%, vegetable fat, said chocolate compound having the color, bulk, mouth feel and flavor of conventional dark compound chocolate.

The cocoa extender of this invention finds use as a substitute for any part of cocoa powder normally used in recipes for baking, etc. The cocoa extender and compound chocolate of this invention may also be used in confectionary products such as ice cream coating, and coatings for candy centers and candy bars.

The invention will be illustrated more completely by the following Examples:

EXAMPLE 1

Ten pounds of peanut grit was roasted in a rotating steel drum at 475° F. for 20 minutes. The roasted peanut grit had a rich chocolate brown color and was pulverized in a hammermill to about 200 mesh. Following the same procedure, like amounts of almond shells and soybean flakes were roasted and pulverized, and rich chocolate brown products were obtained.

EXAMPLE 2

Ten pounds of roasted, pulverized peanut grit prepared in accord with Example 1, was combined with 10 pounds cocoa powder, 35 pounds sugar, 15 pounds non-fat milk solids, and 20 pounds palm oil, and formed into a heavy paste by mixing and heating to 105°–110° F. The heavy paste was refined by passage through roll refiners to reduce the particle size to a fine mesh, an additional 10 pounds of palm oil was added, and the material was thoroughly mixed at 125°–130° F., cooled to 96° F. and molded in the conventional manner.

EXAMPLE 3

5 pounds of cocoa and 5 pounds of the peanut grit cocoa extender of Example 1 were combined and uniformly mixed, forming cocoa extender A. A like uniform mixture of cocoa and soybean flake cocoa extender was prepared forming cocoa extender B. Three conventional cake batters were prepared and to them were added respectively, 10%, by weight, of cocoa extender A, cocoa extender B, and cocoa. The three batters were baked under identical conditions and the resultant cakes compared for appearance, color, mouth feel and flavor. The cake prepared with cocoa extender A was darker in appearance than the cakes prepared with cocoa extender B and cocoa; all cakes had mouth feel (texture), flavor and appearance which were essentially identical.

Having thus described the invention,
What is claimed is:

1. An extended cocoa powder comprising cocoa and a cocoa extender selected from the group consisting of peanut grit, almond shells and soybean flakes in a ratio of 1:99 to 99:1, said cocoa extender being prepared by roasting said cocoa extender at a temperature of from about 275° F. to about 475° F. for from about 20 to about 90 minutes to develop a cocoa imparting color and pulverizing said roasted cocoa extender 200 mesh to a cocoa-like consistency, said extended cocoa powder having the color, bulk, mouth feel and flavor of cocoa.

2. The extended cocoa powder of claim 1 wherein said cocoa powder and cocoa extender are combined in equal proportions.

3. The extended cocoa powder of claim 2 wherein said cocoa extender is peanut grit.

4. The extended cocoa powder of claim 2 wherein said cocoa extender is almond shells.

5. The extended cocoa powder of claim 2 wherein said cocoa extender is soybean flakes.

6. The extended cocoa powder of claim 1 wherein said cocoa extender is acid neutralized, having a pH of from about 7 to about 8.

7. A compound chocolate comprising from about 5 to about 15% cocoa; from about 5 to about 15% of a cocoa extender selected from the group consisting of peanut grit, almond shells and soybean flakes, said cocoa extender being prepared by roasting said cocoa extend of from about 275° F. to about 475° F. for from about 20 to about 90 minutes to develop a cocoa imparting color and pulverizing said roasted cocoa extender to about 200 mesh to a cocoa-like consistency; from about 30 to about 40% sugar; from about 10 to about 15% milk solids; and from about 25 to about 35%, vegetable fat, said compound chocolate having the color, bulk, mouth feel and flavor of convention compound chocolate.

8. The compound chocolate of claim 7 comprising about 10% cocoa; about 10% of said cocoa extender, about 35% sugar, about 15% milk solids, and about 30% vegetable fat.

9. The compound chocolate of claim 8 wherein said cocoa extender is peanut grit.

10. The compound chocolate of claim 8 wherein said cocoa extender is almond shells.

11. The compound chocolate of claim 8 wherein said cocoa extender is soybean flakes.

12. The compound chocolate of claim 7 wherein said cocoa extender is acid neutralized, having a pH of from about 7 to about 8.

13. A dark compound chocolate comprising from about 5 to about 15% cocoa; from about 5 to about 15% of a cocoa extender selected from the group consisting of peanut grit, almond shells and soybean flakes, said cocoa extender being prepared by roasting said cocoa extender at a temperature of from about 275° F. to about 475° F. for from about 20 to about 90 minutes to develop a cocoa imparting color and pulverizing said roasted cocoa extender to about 200 mesh to a cocoa-like consistency; from about 40 to about 50% sugar; and from about 25 to about 35% vegetable fat, said compound chcocolate having the color, bulk, mouth feel and flavor of conventional dark compound chocolate.

14. The dark compound chocolate of claim 13 comprising about 12.5% cocoa, about 12.5% of said cocoa extender, about 45% sugar, and about 30% vegetable fat.

15. The dark compound chocolate of claim 14 wherein said cocoa extender is peanut grit.

16. The dark compound chocolate of claim 14 wherein said cocoa extender is almond shells.

17. The dark compound chocolate of claim 14 wherein said cocoa extender is soybean flakes.

18. The dark compound chocolate of claim 13 wherein said cocoa extender is acid neutralized, having a pH of from about 7 to 8.

19. A process for preparing compound chocolate containing reduced quantities of cocoa yet having the color, bulk, mouth feel and flavor of compound chocolate containing usual levels of cocoa comprising roasting a cocoa extender selected from the group consisting of peanut grit, almond shells and soybean flakes at a temperature of from about 275° F. to about 475° F. for from about 20 to about 90 minutes to develop a cocoa imparting color in said cocoa extender; pulverizing said roasted cocoa extender to about 200 mesh to a cocoa-like consistency; and combining said roasted, pulverized cocoa extender with cocoa, sugar, milk solids and vegetable fat to provide compound chocolate comprising from about 5 to about 15% cocoa; from about 5 to about 15% cocoa extender; from about 30 to about 40% sugar; from about 10 to about 15% milk solids; and from about 25 to about 35% vegetable fat.

20. The process of claim 19 wherein said roasted, pulverized cocoa extender is combined with cocoa, sugar, milk solids and vegetable fat to provide compound chocolate comprising about 10% cocoa, about 10% cocoa extender, about 35% sugar, about 15% milk solids and about 30% vegetable fat.

21. The process of claim 20 wherein said cocoa extender is peanut grit.

22. The process of claim 20 wherein said cocoa extender is almond shells.

23. The process of claim 20 wherein said cocoa extender is soybean flakes.

24. The process of claim 19 wherein said cocoa extender is acid neutralized, having a pH of from about 7 to about 8.

25. A process of preparing dark compound chocolate containing reduced quantities of cocoa yet having the color, bulk, mouth feel and flavor of compound chocolate containing usual levels of cocoa comprising roasting a cocoa extender selected from the group consisting of peanut grit, almond shells and soybean flakes at a temperature of from 275° F. to about 475° F. for from about 20 to about 90 minutes to develop a cocoa imparting color in said cocoa extender; pulverizing said roasted cocoa extender to about 200 mesh to a cocoa-like consistency; and combining said roasted, pulverized cocoa extender with cocoa, sugar and vegetable fat to provide dark compound chocolate comprising from about 5 to about 15% cocoa; from about 5 to about 15% cocoa extender; from about 40 to about 50% sugar; and from about 25 to about 35% vegetable fat.

26. The process of claim 25 wherein said roasted, pulverized cocoa extender is combined with cocoa, sugar and vegetable fat to provide dark compound chocolate comprising about 12.5% cocoa, about 12.5% cocoa extender, about 35% sugar and about 30% vegetable fat.

27. The process of claim 25 wherein said cocoa extender is peanut grit.

28. The process of claim 25 wherein said cocoa extender is almond shells.

29. The process of claim 25 wherein said cocoa extender is soybean flakes.

30. The process of claim 25 wherein said cocoa extender is acid neutralized, having a pH of from about 7 to about 8.

* * * * *

UNITED STATES PATENT AND TRADEMARK OFFICE
CERTIFICATE OF CORRECTION

PATENT NO. : 4,119,740
DATED : October 10, 1978
INVENTOR(S) : Silvio Crespo

It is certified that error appears in the above-identified patent and that said Letters Patent are hereby corrected as shown below:

Column 5, line 47, after "cocoa" delete the word "extend" and insert in place thereof -- extender at a temperature -- .

Column 5, line 55, change the word "convention" to read -- conventional -- .

Signed and Sealed this

Sixteenth Day of January 1979

[SEAL]

Attest:

RUTH C. MASON
Attesting Officer

DONALD W. BANNER
Commissioner of Patents and Trademarks